United States Patent Office 3,378,549
Patented Apr. 16, 1968

3,378,549
2,3 - ACETONIDES OF POLYHYDROXY BIS NORCHOL-7-ENOIC ACID DERIVATIVES
John A. Edwards, John H. Fried, and John B. Siddall, Palo Alto Calif., assignors to Syntex Corporation, Panama, Panama, a corporation of Panama
No Drawing. Filed Nov. 4, 1965, Ser. No. 506,410
29 Claims. (Cl. 260—239.55)

ABSTRACT OF THE DISCLOSURE

Synthesis of the insect hormone ecdysone, novel polyhydroxy steroids, and novel intermediates therefor.

---

The present invention is directed at novel polyhydroxy steroids and to processes for their preparation. Specifically, this invention is directed at a process for preparing compounds of the formula:

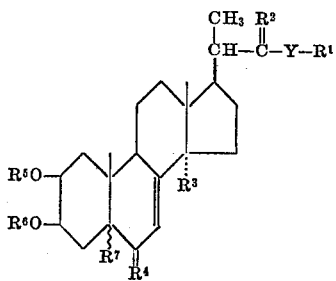

wherein $R^1$ is hydrogen, hydroxy or a hydrocarbon carboxylic acyloxy group of less than 12 carbon atoms;
$R^2$ is an oxygen atom or (hydrogen, hydroxy);
$R^3$ is hydrogen or hydroxy;
$R^4$ is an oxygen atom or (hydrogen, hydroxy);
Each of $R^5$ and $R^6$ is hydrogen or a hydrocarbon carboxylic acyl group of less than 12 carbon atoms, or taken together, the group

in which each of A and B is hydrogen or lower alkyl $R^7$ is a α-hydrogen, β-hydrogen or α-hydroxy; and
Y is an alkylene group of from 3 to 8 carbon atoms, there being at least 3 carbon atoms between the valence bonds of said alkylene group. Moreover, the present invention is directed at the novel compounds of the above formula wherein $R^1$, $R^2$, $R^3$, $R^4$, $R^5$, $R^6$, $R^7$ and Y are as defined but characterized by the proviso that when $R^1$, $R^2$ and $R^3$ are all hydroxy, at least one of $R^4$ and $R^7$ is also hydroxy.

The presence of "asymmetric" carbon atoms in several positions of the above formula permit the existence of isomeric forms. As noted in greater detail hereafter, the methods of the present invention generate both forms, unless otherwise noted, and these forms may be readily separated from one another through conventional methods, e.g., chromatography, fractional crystallization or the like. Unless otherwise noted, all such isomeric forms are embraced by the present invention. Use of a wavy line, "ξ," indicates both α and β configurations, either singularly or collectively. With specific reference to the configuration at C–20 and C–22, the designations α and β are used in accordance with the Fischer convention.

The term alkyl and derivations thereof such as alkylene, alkanoic, etc., denotes an aliphatic hydrocarbon group. When qualified by the term "lower," such a group will contain no more than six carbon atoms. The alkylene group designated by Y will contain from 3 to 8 carbon atoms but in all cases will comprise a straight chain of 3 carbon atoms between $R^1$ and the remainder of the nucleus. This chain of 3 or more carbon atoms may however, be substituted by one or more alkyl groups of 5 or less carbon atoms.

The foregoing compounds demonstrate the ability to affect the growth of insects and are accordingly useful in the control and management of insect population, in addition to finding broad use in biological research. They may be employed for insect control in the same manner as the related insect hormone, ecdysone, whose structure and use are known. Furthermore, the process of the present invention is particularly valuable in synthesizing this compound and many of the compounds of the present invention also serve as valuable intermediates in that synthesis.

The hydrocarbon carboxylic acyl and acyloxy groups of the present invention will contain less than 12 carbon atoms and may be of a straight, branched, cyclic or cyclic-aliphatic chain structure which is saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The preparation of the compounds of the present invention, and with appropriate selection of reagents, ecdysone, may be accomplished in the following manner. A 3β-acetoxy-22,23-bisnorchol-5-enoic acid methyl ester is treated with hot formic acid for 30 or more minutes and after cooling, the product is subjected to the action of hydrogen peroxide. Subsequent alkaline hydrolysis yields the triol (II) which is oxidized, as with N-bromosuccinimide, to yield the 6-keto compound (III). Dehydration leading to the Δ² compound may then be achieved through selective formation of a 3-ester, as through treatment with p-toluenesulfonic acid, benzenesulfonic acid, p-bromo-benzenesulfonyl chloride, or benzoyl chloride in pyridine, and treatment of this ester with base, e.g., lithium carbonate tertiary amines, or the like.

This Δ² compound (IV) is then converted to the 2β,3β-diol (V) with N-bromosuccinimide in glacial acetic acid followed by treatment with a silver salt in an alcohol or tetrahydrofuran, or with anhydrous acetic acid, iodine and dry silver acetate, followed by treatment with silver nitrate and aqueous alcohol. Esterification in, for example, an aromatic amine such as an alkyl pyridine or pyridine alone or with dioxane, with an esterifying agent such as acetic or caproic anhydride, affords the corresponding 2β,3β-diacylate.

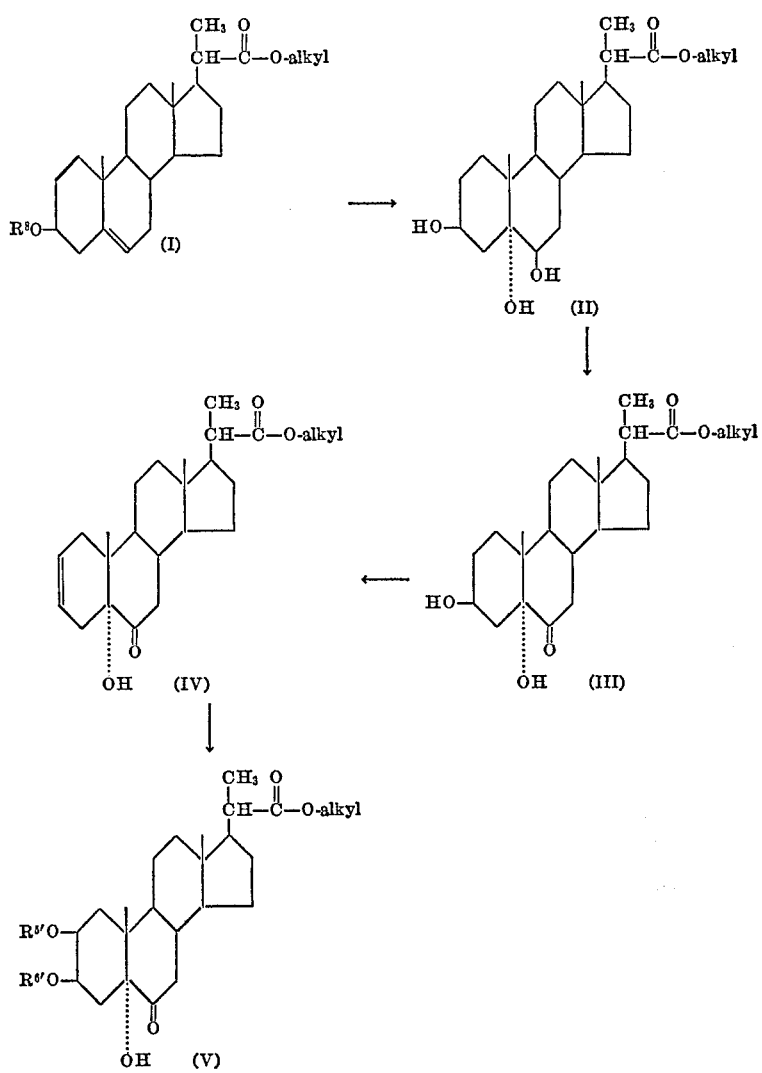

In the foregoing $R^8$ is an acyl group, e.g., acetyl, and each of $R^{5'}$ and $R^{6'}$ is hydrogen or an acyl group.

Introduction of the $\Delta^7$ double bond is next accomplished through α-halogenation with bromine or chlorine, preferably the former, in the presence of an acid catalyst, e.g., a mineral or Lewis acid. Dehydrohalogenation of the 7-halo intermediate with calcium carbonate, lithium carbonate or the like furnishes the $\Delta^7$ derivative (VII) which may contain small amounts of the $\Delta^{8(14)}$ isomer, readily separable at this stage or later through chromatographic techniques.

The triacylate (VIII) may be obtained by conventional esterification of (VII) by, for example, treatment with an anhydride such as acetic or caproic anhydride under acid catalysis such as with benzenesulfonic acid, Lewis acids or anhydrous mineral acids. The triacylate (VIII) may also be prepared from the triol (II) by acylation, bromination, and dehydrohalogenation.

These reactions may be represented as follows:

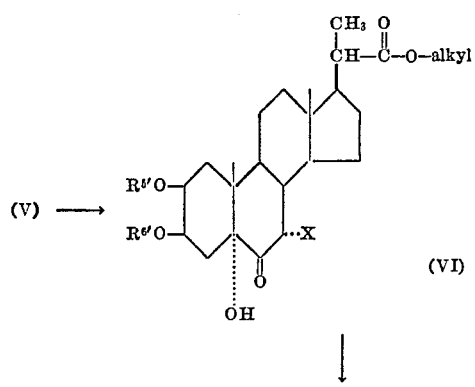

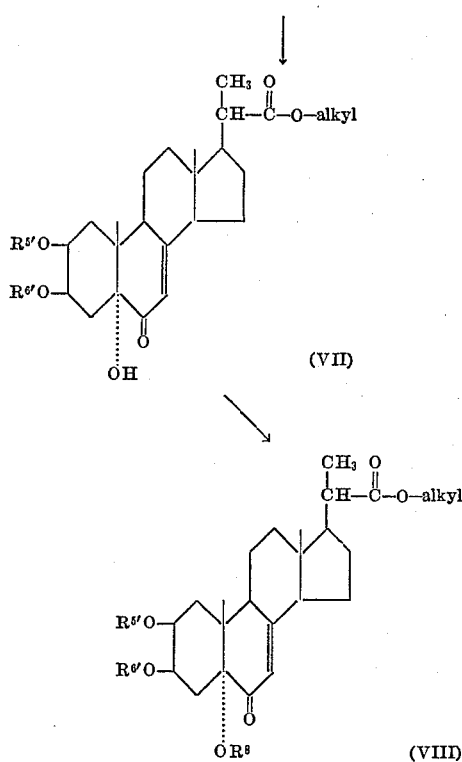

(VII)

(VIII)

In these and the following transformations, $R^{5'}$ and $R^{6'}$ are acyl. $R^8$ is also acyl, and X is chloro or bromo.

The 14α-hydroxyl function is introduced, if desired, directly by treatment of the triacylate (VIII) with tellurium or selenium dioxide, preferably selenium dioxide, in an ether solvent such as dioxane by refluxing for several hours, thus furnishing the 14α-hydroxy-6-keto triacylate (IX).

(VIII) ⟶

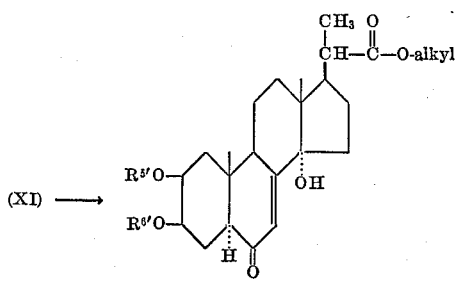

(IX)

The 5α-acyloxy group is next selectively removed from this 14α-hydroxy-6-keto triacylate (IX), if desired, by treatment for a short period with a transition metal salt or complex thereof such as chromous halide or acetate, preferably chromous chloride, in an aqueous or a ketone solvent, preferably acetone, thus affording the 2β,3β-diacyloxy - 14α-hydroxy-6-keto-5α-22,23-bisnorchol-7-enoic acid alkyl ester (X) in high yield. This removal of the tertiary acyloxy is accomplished with stereo-specific entry of the hydrogen yielding solely the trans A/B fused product (X) and may be represented as follows:

(XI) ⟶

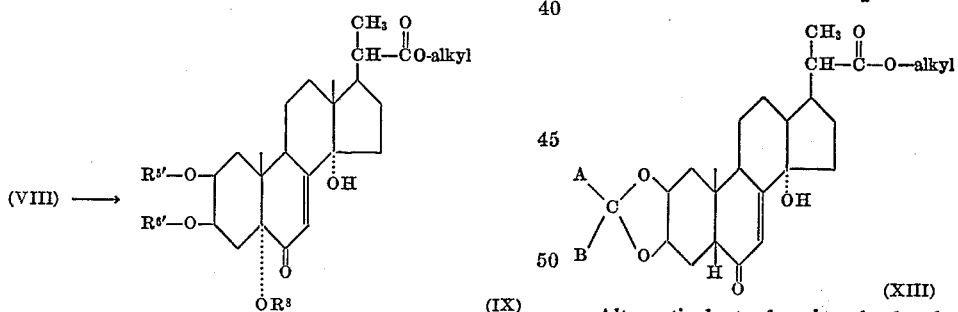

(X)

Alkaline hydrolysis of the 2β,3β-diacyloxy group followed in the case of 5α-desoxy compounds by inversion of the configuration in the 5α-position as with potassium carbonate yields the 2β,3β-dihydroxy-5α-steroid (XI) and the 2β,3β-dihydroxy-5β-steroid (XII) respectively. The order of these two steps may alternatively be reversed. The free dihydroxy 5β-compound is next treated with a ketone such as acetone in the presence of a trace of acid such as p-toluenesulfonic acid to yield the 2β,3β-alkylidenedioxy intermediate (XIII). These reactions may be represented as follows:

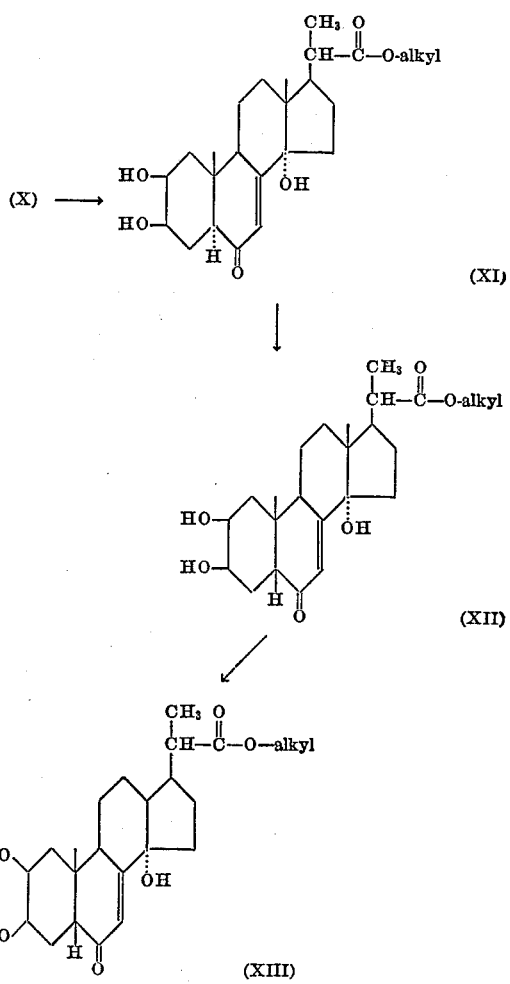

(X) ⟶

(XI)

(XII)

(XIII)

Alternatively to forming the ketal, represented above, the dihydroxy intermediate may be treated with an alkyl orthoester to form the group

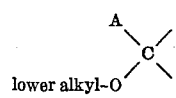

bridging the 2β and 3β-hydroxy oxygen atoms. In this formula, A is as previously defined.

The 6-keto group is then reduced as with sodium borohydride, lithium aluminum tri (t-butoxide) hydride, or the like, to give a mixture of 6α and 6β-hydroxy compounds which may be separated through chromatography or subjected to the next step as a mixture. The resulting 6-hydroxy intermediate is subjected to the action of a Grignard reagent in which hydroxy groups, if present, are first protected through formation of a tetrahydropyranyl ether. In the case of ecdysone, this Grignard reagent is that obtained from magnesium and a 3-methyl-3-tetrahydropyranyloxy-1-halobutane in which the halo group is chloro, iodo, or preferably bromo. Other reagents however, such as those obtained from 1-bromo-3-tetrahydropyranyloxypropane; 1-bromo-3,3-dimethylpropane;

1-chloro-4-tetrahydropyranyloxy-4-ethylpentane and the like, may alternatively be employed.

Employing the steroid starting materials described above, the product of this alkylation (XV) will have the β-configuration at C-20. This may be epimerized through treatment with base to yield the 20α-isomer (XVa). These two products may then be separated as through chromatography on silica gel. These reactions may be represented as follows:

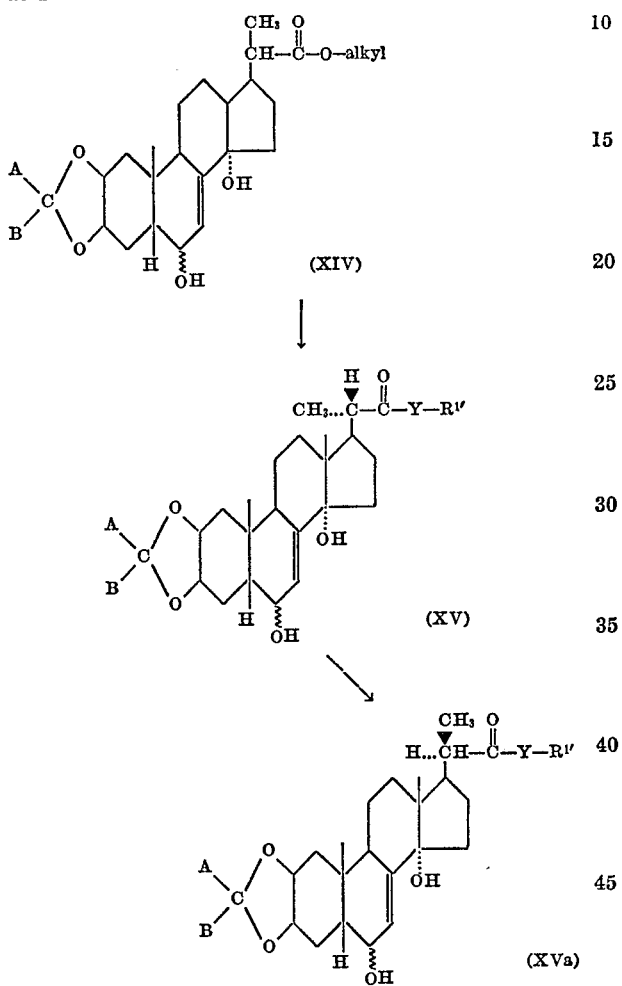

In the foregoing, $R^{1\prime}$ is hydrogen or hydroxy.

Reduction of the 22-keto steroid (XV) or its isomer (XVa) may be accomplished by treatment with an alkali aluminum hydride or an alkali aluminum tri-t-butoxy hydride, preferably lithium, in an anhydrous organic ether, such as tetrahydrofuran, resulting in a mixture of the 22β-hydroxy steroid and the 22α-hydroxy steroid (XVI). The mixture may be separated by conventional chromatographic techniques. Alternatively, the process may be continued using the mixture of 22β-hydroxy and 22α-hydroxy steroids with separation of the isomers performed at a later point.

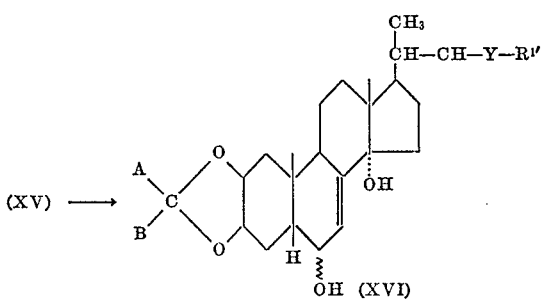

Alternatively, the 6-hydroxy intermediate of Formula XIV may be treated with an unsaturated Grignard reagent such as that obtained from magnesium and 2-methyl-4-bromobut-1-ene to yield a compound of Formula XV wherein the group —Y—$R^1$ has the structure

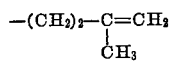

This product is then converted to the corresponding 6-keto compound as through the action of 2,3-dichloro-5,6-dicyanobenzoquinone. The resulting 6,22-diketo compound is subjected to the action of perbenzoic acid or m-chloroperbenzoic acid in chloroform, which may optionally contain a small amount of pyridine, to yield the corresponding 6,22-diketo intermediate bearing a 25,26-oxido group. Treatment of this intermediate, as with lithium aluminum hydride in tetrahydrofuran results in ring opening of this oxido group and conversion of both the keto groups at C-6 and C-22 to hydroxy groups, thus producing a compound of Formula XVI. Other alkenylmagnesium halides may obviously be employed in place of the one described above.

Regeneration of the 6-keto group may be next accomplished, if desired, as with manganese dioxide or preferably 2,3 - dichloro - 5,6-dicyanobenzoquinone, with cleavage of the 2β,3β - alkylidenedioxy function being realized through the action of oxalic or formic acid. These reactions may be represented as follows:

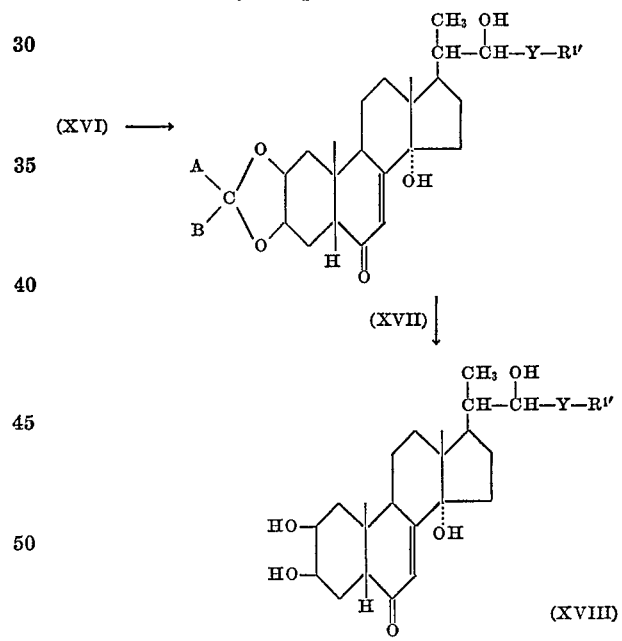

The above processes may thus be utilized to prepare the known insect hormone ecdysone, namely, the compound of Formula XVIII wherein Y is the alkylene group —$CH_2$—$CH_2$—$C(CH_3)_2$— and $R^1$ is hydroxy and the configuration of the 21-methyl group with regard to the 20-carbon atom is β while that of the 22-hydroxy group is β. Alternatively, with various modifications, this process may be employed in the preparation of other valuable compounds. Accordingly by eliminating the step of 5α-dehydroxylation, and thus the epimerization of the C-5 hydrogen as well, there are obtained upon execution of the other steps herein described, compounds bearing a 5α-hydroxy group. Alternatively, or in addition, the oxidation of the 6-hydroxy group may be eliminated to yield 6α and 6β-hydroxy derivatives with the isomers then being separated (if not previously performed). Likewise, elimination of the 14-hydroxylation step yields compounds bearing a 14α-hydrogen. So, too, by dispensing with the reduction of the 22-keto intermediate, one obtains compounds having the 22-carbonyl group intact. Various combinations of these modifications are typified hereafter and others will be apparent to those skilled in the art from the present disclosure of this invention.

Particularly valuable intermediates are those represented by Formulas XI, XII, XIII and XIV above, as well as the corresponding 14-desoxy derivatives thereof.

The following examples will serve to further typify the nature of this invention but should not be construed as a limitation thereof.

Example 1

Fifty grams of 3β-acetoxy-22,23-bisnorchol-5-enoic acid methyl ester are dissolved in 500 ml. of hot (88%) formic acid and held at about 70° C. for about 0.5 hours. Thereafter, the solution is cooled to about 20° C. and 60 ml. of (30%) hydrogen-peroxide is added cautiously and the resulting mixture stirred for 2 hours, whereupon about 750 ml. of hot water is added. A gum is formed which is separated by decantation and filtration. The crude product is washed with water and dissolved in 800 ml. of hot methanol which contains a mixture of 38 g. of potassium hydroxide and 65 ml. of water. Saponification to the triol is complete after approximately 2 minutes. Neutralization of the solution with acetic acid followed by dilution with cold water results in the formation of a solid which is filtered and dried affording 3β,5α,6β-trihydroxy-22,23-bisnorcholanoic acid methyl ester.

A solution containing 50 g. of 3β,5α,6β-trihydroxy-22,23-bisnorcholanoic acid methyl ester in aqueous dioxane (50 ml. water, 450 ml. dioxane) is treated at about 20° C. with 29 g. of N-bromosuccinimide (1.25 moles). The oxidation is complete after about 1.5 hours whereupon excess N-bromosuccinimide is decomposed by the addition of aqueous sodium sulfite until the solution is substantially colorless. The addition of about 1.2 liters of cold water to the solution results in the formation of a white solid. The mixture is cooled in ice and the solid collected by filtration and dried by suction to yield 3β,5α-dihydroxy-6-keto-22,23-bisnorcholanoic acid methyl ester.

To a stirred solution of 38 g. of 3β,5α-dihydroxy-6-keto-22,23-bisnorcholanoic acid methyl ester in 150 ml. of pyridine, cooled to 0° C., is added 50 g. of p-toluenesulfonyl chloride. The mixture is allowed to stand at about 20° C. for about 16 hours and then diluted slowly by the addition of water while cooling in an ice bath whereupon a solid precipitates. The thus-formed solid is separated, washed with water to remove pyridine and dried, thus yielding 5α - hydroxy - 6 - keto - 3β - p - toluenesulfonyloxy-22,23-bisnorcholanoic acid methyl ester, which may be further purified through recrystallization from methylene chloride/hexane.

To a mixture of 18 g. of lithium carbonate and 210 ml. of dimethyl acetamide at about 150° C. under nitrogen are added quickly 30 g. of the foregoing crystallized tosylate derivative. The mixture is maintained at a temperature of approximately 150° C. for 10 minutes and then cooled rapidly to about 0° C. The cooled mixture is added to cold water yielding a solid which is collected by filtration, dried and extracted with benzene/water. These extracts are concentrated to give 5α-hydroxy-6-keto-22,23-bisnorchol-2-enoic acid methyl ester which is recrystallized from methylene chloride/hexane.

To a stirred mixture containing 326 mg. of 5α-hydroxy-6-keto-22,23-bisnorchol-2-enoic acid methyl ester, 10 ml. of dry acetic acid and 260 mg. of iodine is added 167 mg. of dry silver acetate, portionwise, over a one-hour period. Stirring is continued for approximately 6 hours whereupon the reaction mixture is taken up in methylene chloride, filtered, and washed with aqueous sodium thiosulfate and water. The methylene chloride is evaporated in vacuum at room temperature and the residue therefrom treated with excess silver nitrate and 10% aqueous methanol for approximately 10 minutes at about 70° C. The resulting reaction mixture is cooled, filtered and the filtrate taken up in methylene chloride. This organic solution is washed with water and evaporated under vacuum. The thus-obtained crude product is chromatographed on silica gel, eluting with ethyl acetate/hexane mixtures. The desired 2β,3β,5α - trihydroxy-6-keto-22,23 - bisnorcholanoic acid methyl ester is obtained by mild alkaline hydrolysis of the most polar of the products from the column.

A mixture containing 170 mg. of 2β,3β,5α-trihydroxy-6-keto-22,23-bisnorcholanoic acid methyl ester and 2 ml. of 3:7 acetic anhydride:pyridine is allowed to stand at 90° C. for about 3 hours. The mixture is then concentrated to dryness under vacuum to afford 2β,3β-diacetoxy-5α-hydroxy-6-keto-22,23-bisnorcholanoic acid methyl ester which is recrystallized from methanol.

Example 2

A solution containing 3.8 g. of 2β,3β-diacetoxy-5α-hydroxy-6-keto-22,23-bisnorcholanoic acid methyl ester, 16 ml. of acetic acid, 2.4 ml. of 15% hydrogen bromide in acetic acid, and 9 ml. of bromine in acetic acid (127 mg. of bromine per ml. of acetic acid) is stirred at room temperature for 4 hours. Thereafter, excess bromine is decomposed by the addition of 2% aqueous sodium sulfite and approximately 150 ml. of water is then added to complete precipitation. Filtration and drying by suction yields 7α-bromo - 2β,3β-diacetoxy - 5α-hydroxy - 6-keto-22,23-bisnorcholanoic acid methyl ester which is recrystallized from methylene chloride/methanol.

A mixture of 450 mg. of this 7α-bromo steroid (VI), 12 ml. of dimethyl acetamide and 400 mg. of lithium carbonate is refluxed under an atmosphere of nitrogen for 12 minutes and thereafter rapidly cooled in an ice bath. The reaction mixture is washed, filtered, and the filtrate extracted with methylene chloride. The methylene chloride extracts are thereafter washed with water and saturated sodium chloride solution and concentrated in vacuum to yield 2β,3β-diacetoxy-5α-hydroxy-6-keto-22,23-bisnorchol-7-enoic acid methyl ester and 2β,3β-diacetoxy-5α - hydroxy - 6-keto-22,23-bisnorchol - 8(14)-enoic acid methyl ester. These compounds may be separated at this point by chromatography on silica gel. Alternatively, the mixture may be carried forward and separated at a later stage.

A solution containing 5 ml. of acetic acid, 2 ml. of acetic anhydride and 450 mg. of 2β,3β-diacetoxy-5α-hydroxy-6-keto-22,23-bisnorchol-7-enoic acid methyl ester and 100 mg. of p-toluenesulfonic acid is stirred at room temperature for 3.5 hours and then added cautiously to dilute aqueous potassium bicarbonate and subjected to extraction with methylene chloride. The methylene chloride extracts are thereafter washed with water and saturated sodium chloride solution and concentrated to dryness under vacuum yielding 6-keto-2β,3β,5α-triacetoxy-22,23-bisnorchol-7-enoic acid methyl ester.

This triacetate may also be obtained from the triol by successive acid-catalyzed acetylation, halogenation and dehydrohalogenation.

Example 3

A mixture containing 140 mg. of selenium dioxide, 10 ml. of dry dioxane, and 265 mg. of 6-keto-2β,3β,5α-triacetoxy-22,23-bisnorchol-7-enoic acid methyl ester is refluxed for 4 hours. Thereafter, the reaction mixture is cooled, filtered, and the filtrate washed with dilute aqueous potassium bicarbonate and extracted with methylene chloride. The methylene chloride extracts are washed with saturated sodium chloride solution, dried and filtered through Celite diatomaceous earth. The filtrate is concentrated to dryness affording 14α-hydroxy-6-keto-2β,3β,5α-triacetoxy-22,23-bisnorchol-7-enoic acid methyl ester.

Example 4

To a solution of 90 mg. of 14α-hydroxy-6-keto-2β,3β,5α-triacetoxy-22,23-bisnorchol-7-enoic acid methyl ester and 5 ml. of acetone is added 4 ml. of 25% solution chromous chloride in 1 N hydrochloric acid. The solution is allowed to stand for 2 minutes whereupon it is poured into a water/methylene chloride mixture. The organic lay-

11 er is separated and washed successively with dilute aqueous potassium bicarbonate, water, and saturated sodium chloride solution, dried over sodium sulfate, and concentrated to dryness, thus yielding 2β,3β-diacetoxy-14α - hydroxy - 6-keto-22,23-bisnor-5α-chol-7-enoic acid methyl ester.

Example 5

A mixture of 1 g. of 2β,3β-diacetoxy-14α-hydroxy-6-keto-22,23-bisnor-5α-chol-7-enoic acid methyl ester, 0.33 g. of potassium carbonate, and 100 ml. of 90% aqueous methanol is allowed to stand for approximately one hour at room temperature. Thereafter, ethyl acetate and saturated sodium chloride solution are added to the mixture and the layers separated. The organic layer is neutralized, washed with water, dried over sodium sulfate and concentrated to dryness at room temperature to yield 2β,3β,14α-trihydroxy - 6 - keto-22,23-bisnor-5α-chol-7-enoic acid methyl ester.

Example 6

A mixture containing 1 g. of 2β,3β,14α-trihydroxy-6-keto-22,23-bisnor-5α-chol-7-enoic acid methyl ester, 0.33 g. of potassium carbonate, and 100 ml. of 90% aqueous methanol is allowed to stand for approximately twenty hours at room temperature. The product is recovered by extraction with ethyl acetate in the manner described in the preceding paragraph and consists of a mixture of 2β,3β,14α-trihydroxy - 6 - keto - 22,23 - bisnor-5β-chol-7-enoic acid methyl ester and the 5α epimer which are separated by chromatography. The 5α epimer may be recycled for further preparation of the 5β compound.

Example 7

A mixture containing 0.5 g. of 2β,3β,14α-trihydroxy-6-keto-22,23-bisnor-5β-chol-7-enoic acid methyl ester, 30 ml. of acetone, and 50 mg. of p-toluenesulfonic acid is allowed to stand at room temperature for approximately 2 hours. The reaction mixture is thereafter poured into cold, saturated aqueous potassium bicarbonate solution and extracted with ethyl acetate. The ethyl acetate extracts are washed with water to neutrality, dried over sodium sulfate and concentrated to dryness at room temperature to yield 2β,3β - isopropylidenedioxy - 14α - hydroxy-6-keto-22,23-bisnor-5β-chol-7-enoic acid methyl ester.

A mixture of 1 g. of this product, 100 ml. of anhydrous tetrahydrofuran, and 2 g. of lithium aluminum tri-(t-butoxy) hydride is stirred for approximately 2 hours. The reaction mixture is stirred with ethyl acetate and then with saturated sodium chloride solution. The mixture is next filtered and the filtrate extracted with ethyl acetate. The ethyl acetate extracts are washed with water, dried over sodium sulfate, and concentrated to dryness under vacuum to yield 2β,3β-isopropylidenedioxy-6,14α-dihydroxy-22,23-bisnor-5β-chol-7-enoic acid methyl ester which may be separated into the 6α and 6β isomers or may be used as a mixture of the two.

Example 8

A mixture containing 0.4 g. of 2β,3β-isopropylidenedioxy - 6,14α-dihydroxy-22,23-bisnor-5β-chol-7-enoic acid methyl ester, 15 ml. of tetrahydrofuran, 3 g. of 3-methyl-3-tetrahydropyranyloxy-1-bromobutane and 0.3 g. of magnesium metal is stirred overnight under argon. If scratching or breaking a piece of magnesium metal does not initiate reaction, methylmagnesium chloride may be added dropwise until gas evolution ceases. At the end of the reaction period, the mixture is filtered and the filtrate collected in saturated potassium sodium tartrate solution. The filtrate is extracted with ethyl acetate and these extracts are washed successively with sodium bicarbonate solution, saturated sodium chloride solution and water, dried over sodium sulfate and evaporated. The residue is chromatographed to yield 2β,3β-isopropylidenedioxy-6,14α,25-trihydroxy-5β-cholest-7-en-22-one.

12

The requisite starting material for the Grignard reagent described above, may be prepared as follows:

To a solution of 120 g. of methyl 3-bromopropionate in 600 ml. dry ether is added 2.5 equivalents of 3 ml. methylmagnesium bromide in ether. The mixture is refluxed for about 1 hour and then poured into saturated aqueous ammonium chloride solution until no insoluble magnesium salt remains. The resulting mixture is extracted with ether and these extracts are dried and concentrated under vacuum. The residual oil is distilled under vacuum to yield 3-methyl-1-bromobutan-3-ol. This material is treated with 1.05 equivalents of distilled dihydropyran at about 0° C. If necessary, a small amount of p-toluenesulfonic acid may be added to promote the reaction. When the reaction is complete, which may be determined by chromatography, the reaction mixture is taken up in hexane and passed through a column of Florisil absorbent to yield 3-methyl-3-tetrahydropyranyloxy-1-bromobutane.

Example 9

A mixture containing 1 g. of 2β,3β-isopropylidenedioxy-6,14α,25-trihydroxy-5β-cholest-7-en-22-one, 100 ml. of anhydrous tetrahydrofuran, and 2 g. of lithium aluminum tri-(t-butoxy)hydride is stirred at room temperature for approximately 6 hours. The reaction mixture is then diluted with ethyl acetate and saturated aqueous sodium chloride solution, filtered and extracted with ethyl acetate. The ethyl acetate extracts are washed with water, dried over sodium sulfate, and concentrated to dryness under vacuum, yielding a mixture of 2β,3β-isopropylidenedioxy-6,14α,22β,25-tetrahydroxy-5β-cholest-7-ene and the corresponding 22α-isomer. The mixture is separated at this point by chromatography on silica gel. Alternatively, the two isomers may be separated at a later stage in the synthesis.

In lieu of purifying the steroid ketone before reduction, one may utilize the crude product from the Grignard reaction.

Example 10

A mixture containing 1 g. of 2β,3β-isopropylidenedioxy-6,14α,22β,25-tetrahydroxy-5β-cholest-7-ene, 20 ml. of dioxane, and 1.1 molar equivalents of 2,3-dichloro-5,6-dicyano-1,4-benzoquinone is allowed to stand at room temperature for 3 hours. The reaction mixture is thereafter filtered and the filtrate evaporated to dryness. The residue is purified by chromatography to yield 2β,3β-isopropylidenedioxy - 14α,22β,25-trihydroxy-5β-cholest-7-en-6-one.

Example 11

A mixture containing 1 g. of 2β,3β-isopropylidenedioxy-14α,22β,25-trihydroxy-5β-cholest-7-en-6-one, 180 ml. of 80% aqueous tetrahydrofuran, and 250 mg. of oxalic acid is allowed to stand at room temperature for about 20 hours. The reaction mixture is then washed to neutrality with potassium bicarbonate and extracted with ethyl acetate. The combined ethyl acetate extracts are washed with water, dried over sodium sulfate, and concentrated to dryness to yield 2β,3β,14α,22β,25-pentahydroxy-5β-cholest-7-en-6-one whose physical constants are in agreement with those reported in the literature.

Example 12

A mixture containing 265 mg. of 2β,3β-diacetoxy-5α-hydroxy-6-keto-22,23-bisnorchol-7-enoic acid methyl ester, 140 mg. of selenium dioxide and 10 ml. of dry dioxane is refluxed for approximately 4 hours. The mixture is then cooled, filtered and the filtrate washed with dilute aqueous potassium bicarbonate and extracted with methylene chloride. The methylene chloride phase is washed with saturated aqueous sodium chloride solution, dried and filtered through Celite diatomaceous earth. The filtrate is concentrated to dryness affording 2β,3β-diacetoxy-5α,14α-dihydroxy-6-keto-22,23-bisnorchol-7-enoic acid methyl ester.

Upon subjecting this compound to the hydrolysis procedure described in Example 5, there is obtained 2β,3β,5α, 14α - tetrahydroxy - 6 - keto-22,23-bisnorchol-7-enoic acid methyl ester. This compound is then sequentially treated according to the procedures described in Examples 7 through 11, thereby forming as the final product, 2β,3β, 5α,14α,22β,25-hexahydroxycholest-7-en-6-one.

Example 13

In a similar fashion to that described in the last paragraph of Example 12, 2β,3β-diacetoxy-5α-hydroxy-6-keto-22,23-bisnorchol-7-enoic acid methyl ester is hydrolyzed according to the procedure of Example 5 and the resulting 2β,3β,5α-trihydroxy compound is then utilized in the procedures of Examples 7 through 11, sequentially, thereby yielding upon completion of the last step, 2β,3β,5α, 22β,25-pentahydroxycholest-7-en-6-one.

Example 14

6-keto-2β,3β,5α-triacetoxy-22,23-bisnorchol-7-enoic acid methyl ester is subjected sequentially to the procedures described in Examples 4 through 11 and upon completion of the steps therein described, there is obtained 2β,3β, 22β,25-tetrahydroxy-5β-cholest-7-en-6-one.

Example 15

2β,3β - isopropylidenedioxy - 6,14α,25 - trihydroxy - 5β-cholest-7-en-22-one is subjected to the procedure of Examples 10 and 11 in that order and there is thus obtained 2β,3β,14α,25 - tetrahydroxy - 5β-cholest-7-ene-6,20-dione. Alternatively, by subjecting this same starting material to only the procedure of Example 11, there is obtained a mixture of 2β,3β,6α,14α,25-pentahydroxy-5β-cholest-7-en-22-one and 2β,3β,6β,14α,25-pentahydroxy-5β-cholest-7-en-22-one which may be separated by chromatography.

Example 16

By subjecting 2β,3β,14α-trihydroxy-6-keto-22,23-bisnor-5α-chol-7-enoic acid methyl ester to the procedures described in Examples 7 through 11, there is obtained 2β,3β, 14α,22β,25-pentahydroxy-5α-cholest-7-en-6-one.

Example 17

By employing 1-bromo-3-ethyl-3-tetrahydropyranyloxypentane in place of 3-methyl-3-tetrahydropyranyloxy-1-bromobutane in the procedure of Example 8, and thereafter performing the procedures of Examples 9 through 11 in their given order, there is obtained 2β,3β,14α,22β,25-pentahydroxy-26,27-dimethyl-5β-cholest-7-en-6-one. The requisite starting material may be obtained from methyl 3-bromopropionate and ethyl magnesium bromide according to the method described in the last paragraph of Example 8.

Similarly by use of propyl bromide and isobutyl bromide, there are respectively obtained according to this reaction sequence, 2β,3β,14α,22β-tetrahydroxy-26,27-bisnor - 5β - cholest-7-en-6-one and 2β,3β,14α,22β-tetrahydroxy-24-methyl-26,27-bisnor-5β-cholest-7-en-6-one.

Example 18

To a mixture of 0.4 gram of 2β,3β-isopropylidenedioxy-6,14α-dihydroxy-22,23-bisnor-5β-chol-7-enoic acid methyl ester and 15 ml. of tetrahydrofuran are added, under argon, 1.5 g. of 2-methyl-4-bromobut-1-ene and 0.3 g. of magnesium metal and this mixture is then stirred 15 hours under argon. If scratching or breaking a piece of magnesium metal does not initiate the reaction methylmagnesium chloride may be added dropwise until gas evolution ceases. At the end of the reaction period the mixture is filtered and the filtrate is collected in a saturated aqueous solution of sodium tartrate. The filtrate thus obtained is extracted with ethyl acetate and these extracts are washed with sodium bicarbonate solution, saturated sodium chloride solution and water, dried over sodium sulfate and evaporated. The residue is chromatographed on silica gel to yield 2β,3β-isopropylidenedioxy-6,14α-dihydroxy-5β-cholesta-7,25-dien-22-one.

A mixture containing 1 g. of 2β,3β-isopropylidenedioxy-6,14α-dihydroxy-5β-cholesta-7,25-dien-22-one, 20 ml. of dioxane and 1.1 molar equivalents of 2,3-dichloro-5,6-dicyano-1,4-benzoquinone is allowed to stand at room temperature for 3 hours. The reaction mixture is then filtered and the filtrate evaporated to dryness. The residue is further purified by chromatography to yield 2β,3β-isopropylidenedioxy - 14α - hydroxy-5β-cholesta-7,25-diene-6,22-dione.

One gram of 2β,3β-isopropylidenedioxy-14α-hydroxy-5β-cholesta-7,25-diene-6,22-dione in 10 ml. of chloroform and 1 ml. of pyridine is allowed to stand in the dark and at room temperature with 1.1 molar equivalents of m-chloroperbenzoic acid for 20 hours. At the end of this time, water is added and the organic layer is separated, washed with aqueous sodium bicarbonate and then with water, dried over sodium sulfate and evaporated to dryness to yield 2β,3β-isopropylidenedioxy-25,26-oxido-5β-cholest-7-ene-6,22-dione.

A solution of 1 g. of this oxido compound in 50 ml. of anhydrous tetrahydrofuran is added over a 30-minute period to a stirred suspension of 1 g. of lithiumaluminum hydride in 50 ml. of anhydrous tetrahydropyran. This mixture is heated at reflux for two hours and 5 ml. of ethyl acetate and 2 ml. of water are then cautiously added. After the addition of sodium sulfate, the mixture is filtered and the solid thus collected is washed well with hot ethyl acetate. The combined filtrate and organic washings are evaporated to dryness to yield 2β,3β-isopropylidenedioxy - 6,14α,22β,25 - tetrahydroxy-5β-cholest-7-ene which may be further purified through recrystallization from acetone:hexane or through chromatography and thereafter employed in the procedure of Example 10. Alternatively, the various isomers obtained upon reduction with lithiumaluminum hydride are separated after completing the oxidative procedure of Example 10.

What is claimed is:
1. The compounds of the formula:

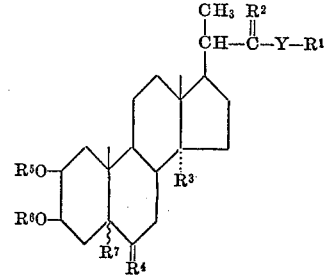

wherein
R¹ is hydrogen, hydroxy or a hydrocarbon carboxylic acyloxy group of less than 12 carbon atoms;
R² is an oxygen atom or (hydrogen, hydroxy);
R³ is hydrogen or hydroxy;
R⁴ is an oxygen atom or (hydrogen, hydroxy);
each of R⁵ and R⁶ is hydrogen or a hydrocarbon carboxylic acyl group of less than 12 carbon atoms or taken together, the group

in which each of A and B is hydrogen or lower alkyl
R⁷ is α-hydrogen, β-hydrogen or α-hydroxy,
Y is an alkylene group of from 3 to 8 carbon atoms, there being at least 3 carbon atoms between the valence bonds of said alkylene group,
provided, that when R¹, R² and R³ are all hydroxy, at least one of R⁴ and R⁷ is also hydroxy.
2. Compounds according to claim 1 wherein R⁷ is α-hydroxy.
3. Compounds according to claim 1 wherein R³ is hydrogen.
4. Compounds according to claim 1 wherein R² is an oxygen atom.

5. Compounds according to claim 1 wherein $R^1$ is hydrogen.

6. Compounds according to claim 1 wherein
$R^1$ is hydroxy;
$R^2$ is (hydrogen, hydroxy);
$R^3$ is hydroxy;
$R^4$ is an oxygen atom;
each of $R^5$ and $R^6$ is a hydrogen atom;
$R^7$ is hydroxy; and
Y is as defined in claim 1.

7. Compounds according to claim 6 wherein Y is the group $$-CH_2-CH_2-\underset{\underset{CH_3}{|}}{\overset{\overset{CH_3}{|}}{C}}-$$

the tertiary carbon of said group being attached to $R^1$.

8. Compounds according to claim 1 wherein
$R^1$ is hydroxy;
$R^2$ is (hydrogen, hydroxy);
$R^3$ is hydroxy;
$R^4$ is (hydrogen, hydroxy);
each of $R^5$ and $R^6$ is hydrogen;
$R^7$ is β-hydrogen; and
Y is as defined in claim 1.

9. Compounds according to claim 8 wherein Y is the group $$-CH_2-CH_2-\underset{\underset{CH_3}{|}}{\overset{\overset{CH_3}{|}}{C}}-$$

the tertiary carbon of said group being attached to $R^1$.

10. Compounds according to claim 1 wherein
$R^1$ is hydroxy;
$R^2$ is (hydrogen, hydroxy);
$R^3$ is hydrogen;
$R^4$ is an oxygen atom;
each of $R^5$ and $R^6$ are hydrogen;
$R^7$ is β-hydrogen; and
Y is as defined in claim 1.

11. Compounds according to claim 10 wherein Y is the group $$-CH_2-CH_2-\underset{\underset{CH_3}{|}}{\overset{\overset{CH_3}{|}}{C}}-$$

the tertiary carbon of said group being attached to $R^1$.

12. Compounds according to claim 1 wherein
$R^1$ is hydroxy;
$R^3$ is an oxygen atom;
$R^3$ is hydroxy;
$R^4$ is an oxygen atom;
each of $R^5$ and $R^6$ is hydrogen;
$R^7$ is β-hydrogen; and
Y is as defined in claim 1.

13. Compounds according to claim 12 wherein Y is the group $$-CH_2-CH_2-\underset{\underset{CH_3}{|}}{\overset{\overset{CH_3}{|}}{C}}-$$

the tertiary carbon of said group being attached to $R^1$.

14. Compounds of the formula wherein:
$R^1$ is hydrogen, hydroxy or a hydrocarbon carboxylic acyloxy group of less than 12 carbon atoms;
$R^2$ is an oxygen atom or (hydrogen, hydroxy);
$R^3$ is hydrogen or hydroxy;
$R^4$ is an oxygen atom or (hydrogen, hydroxy);
$R^7$ is α-hydrogen, β-hydrogen or α-hydroxy;
each of A and B is hydrogen or lower alkyl; and
Y is an alkylene group of from 3 to 8 carbon atoms, there being at least 3 carbon atoms betwen the valence bond of said alkylene group.

15. Compounds according to claim 14 wherein
$R^1$ is hydroxy;
$R^2$ is (hydrogen, hydroxy);
$R^3$ is hydroxy;
$R^4$ is an oxygen atom;
$R^7$ is β-hydrogen;
each of A and B are methyl; and
Y is the group $$-CH_2-CH_2-\underset{\underset{CH_3}{|}}{\overset{\overset{CH_3}{|}}{C}}-$$

the tertiary carbon of said group being attached to $R^1$.

16. Compounds of the formula:

wherein
$R^3$ is hydrogen or hydroxy;
$R^4$ is an oxygen atom or (hydrogen, hydroxy);
each of $R^5$ and $R^6$ is hydrogen or a hydrocarbon carboxylic acyloxy group of less than 12 carbon atoms or taken together, the group:

in which each of A and B is hydrogen or lower alkyl, and
$R^7$ is α-hydrogen, β-hydrogen or α-hydroxy.

17. Compounds according to claim 16 wherein
$R^3$ is hydrogen;
$R^4$ is an oxygen atom;
each of $R^5$ and $R^6$ is acetyl; and
$R^7$ is α-hydroxy.

18. Compounds according to claim 16 wherein
$R^3$ is hydroxy;
$R^4$ is an oxygen atom;
each of $R^5$ and $R^6$ is acetyl; and
$R^7$ is α-hydrogen.

19. Compounds according to claim 16 wherein
$R^3$ is hydroxy;
$R^4$ is an oxygen atom;
each of $R^5$ and $R^6$ is hydrogen; and
$R^7$ is α-hydrogen.

20. Compounds according to claim 16 wherein
$R^3$ is hydroxy;
$R^4$ is an oxygen atom;
each of $R^5$ and $R^6$ is hydrogen; and
$R^7$ is β-hydrogen.

21. Compounds according to claim 16 wherein
$R^3$ is hydroxy;
$R^4$ is an oxygen atom;

R⁵ and R⁶ taken together are the group

R⁷ is β-hydrogen.

22. Compounds according to claim 16 wherein
R₃ is hydroxy;
R⁴ is (hydrogen, hydroxy);
R⁵ and RL⁶ taken together are the group

R⁷ is β-hydrogen.

23. The process for conversion of a 2β,3β,5α-triacyloxy-6-keto-22,23,-bis-norchol - 7 - enoic acid lower alkyl ester to the corresponding 6-keto-14α-hydroxy-Δ⁷-steroid which comprises treating said 6-keto-Δ⁷-steroid with selenium dioxide.

24. The process according to claim 23 wherein the 6-keto-Δ⁷-steroid starting material is 2β,3β,5α-triacetoxy-6-keto - 22,23 - bisnorchol-7-enoic acid methyl ester.

25. The process for the conversion of a 5α-acyloxy-6-keto-14α-hydroxy-Δ⁷-steroid to the corresponding 6-keto-14α-hydroxy-Δ⁷-5α-steroid which comprises treating said 5α-acyloxy-6-keto-14α-hydroxy - Δ⁷ - steroid with chromous chloride, said 5α-acyloxy-6-keto-14α - hydroxy-Δ⁷-steroid being selected from the group consisting of 2β,3β,5α-triacyloxy - 6 - keto-14α-hydroxy - 22,23 - bisnorchol-7-enoic acid lower alkyl ester and 5α-acyloxy-6 - keto - 2β,3β,14α-trihydroxy-22,23-bisnorchol-7-enoic acid lower alkyl ester.

26. The process according to claim 25 wherein said 5α-acyloxy-6-keto-14α - hydroxy - Δ⁷-steroid is a 2β,3β,5α-triacyloxy - 6 - keto-14α-hydroxy-22,23-bisnorchol - 7-enoic acid lower alkyl ester.

27. The process according to claim 25 wherein the 5α-acyloxy - 6 - keto-14αhydroyx-Δ⁷-steroid is 2β,3β,5α - triacetoxy-14α-hydroxy-6-keto-22,23-bisnorchol - 7 - enoic acid methyl ester.

28. The process which comprises treating a 3β-acyloxy-22,23-bisnorchol - 5 - enoic acid lower alkyl ester with formic acid followed by hydrogen peroxide to furnish 3β-acyloxy-5α,6β-dihydroxy-22,23-bisnorchol - 5 - enoic acid lower alkyl ester; converting said 3β-acyloxy-5α,6β-dihydroxy steroid by alkaline hydrolysis into the corresponding 3β,5α,6β-trihydroxy steroid; selectively oxidizing said 3β,5α,6β-trihydroxy steroid into the corresponding 3β,5α-dihydroxy - 6 - keto steroid by treatment with N-bromosuccinimide; converting said 3β,5α-dihydroxy - 6 - keto steroid into the corresponding 5α-hydroxy-6-keto-22,23-bisnorchol-2-enoic acid lower alkyl ester by treating said 3β,5α-dihydroxy-6-keto steroid with p-toluenesulfonic acid, benzenesulfonic acid, p-bromobenzenesulfonyl chloride or benzoyl chloride to furnish the corresponding 3-ester followed by treating said 3-ester with lithium carbonate or tertiary amine; cis hydroxylating the thus-obtained Δ² steroid by treatment with N-bromosuccinimide in acetic acid followed by treatment with a silver salt in an alcohol or tetrahydrofuran or by treating with dry silver acetate, iodine and anhydrous acetic acid followed by treatment with silver nitrate in aqueous alcohol to obtain the corresponding 2β,3β,5α-trihydroxy steroid; esterifying said 2β,3β,5α-trihydroxy steroid by treatment with a hydrocarbon carboxylic acid or anhydride to obtain the corresponding 2β,3β-diacyloxy - 5α - hydroxy-6-keto steroid; treating said 2β,3β-diacyloxy-5α-hydroxy-6-keto steroid with bromine or chlorine in the presence of an acid catalyst to obtain the corresponding 7α-halo steroid which is treated with an alkaline earth carbonate or alkali metal carbonate to furnish the corresponding Δ⁷ steroid; esterifying said Δ⁷ steroid by treating with a hydrocarbon carboxylic acid or anhydride to obtain the corresponding 2β,3β,5α-triacyloxy-6-keto-Δ⁷ steroid; treating said triacyloxy steroid with selenium dioxide to obtain the corresponding 14α-hydroxy steroid; treating said 2β,3β,5α-triacyloxy-6-keto-14α-hydroxy-Δ⁷ steroid with chromous chloride to obtain the corresponding 2β,3β-diacyloxy-6-keto - 14α - hydroxy-22,23-bisnor-5α-chol - 7 - enoic acid lower alkyl ester; hydrolyzing the thus-obtained 5α-steroid by treatment with base to obtain the corresponding 2β,3β,14α-trihydroxy steroid; epimerizing said 2β,3β14α-trihydroxy-5α-steroid by treatment with an alkali carbonate to obtain the corresponding 2β,3β,14α-trihydroxy-5β-steroid; and treating said 2β,3β,14α-trihydroxy-5β-steroid with a ketone in the presence of a trace of acid to furnish the corresponding 2β,3β - alkylidenedioxy-6-keto-14α-hydroxy-22,23-bisnor-5β-chol - 7 - enoic acid lower alkyl ester.

29. The process according to claim 28 wherein said 2β,3β-alkylidenedioxy - 6 - keto-14α-hydroxy - 22,23 - bisnor-5β-chol-7-enoic acid lower alkyl ester is treated with an alkali metal hydride to obtain the corresponding 6-hydroxy steroid; treating said 6-hydroxy steroid with 3-methyl - 3 - tetrahydropyranyloxybutylmagnesium bromide to furnish the corresponding 6,14α,25-trihydroxy steroid; treating said 6,14α,25-trihydroxy steroid with an alkali metal hydride to furnish the corresponding 6,14α,22,25-tetrahydroxy steroid, selectively oxidizing said tetrahydroxy steroid by treatment with 2,3-dichloro-5,6-dicyano-1,4-benzoquinone to furnish the corresponding 14α,22,25-trihydroxy - 6 - keto steroid; and hydrolyzing said 14α,22,25-trihydroxy-6-keto steroid by treatment with acid to furnish 2β,3β,14α,22β,25-pentahydroxy - 5β - cholest-7-en-6-one.

References Cited

Huber et al.: "Chemische Berichte" (1965), July, p. 2410 relied on.

Siddall et al.: "Journal Amer. Chem. Soc.," Jan. 20, 1966, pp. 379–380 relied on.

ELBERT L. ROBERTS, *Primary Examiner.*

UNITED STATES PATENT OFFICE
CERTIFICATE OF CORRECTION

Patent No. 3,378,549                      April 16, 1968

John A. Edwards et al.

It is certified that error appears in the above identified patent and that said Letters Patent are hereby corrected as shown below:

Column 7, the upper right-hand portion of formula (XVa) should appear as shown below:

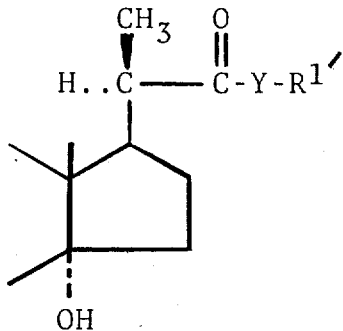

same column 7, the upper right-hand portion of formula (XVI) should appear as shown below:

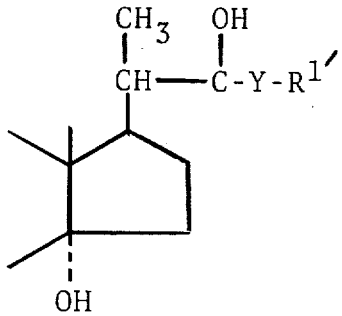

Column 13, line 28, "6,20-dione" should read -- 6,22-dione --.

3,378,549

(2)

Column 15, line 49, "$R^3$ is an oxygen atom" should read -- $R^2$ is an oxygen atom --. Column 17, lines 2 to 5, after the group, insert -- ; and --; line 9, "$R_3$" should read -- $R^3$ --; line 11, "$RL^6$" should read -- $R^6$ --; lines 11 to 15, after the group, insert -- ; and --.

Signed and sealed this 9th day of June 1970.

(SEAL)
Attest:

EDWARD M. FLETCHER, JR.
Attesting Officer

WILLIAM E. SCHUYLER, JR.
Commissioner of Patents